(12) United States Patent
Chang et al.

(10) Patent No.: US 8,732,702 B2
(45) Date of Patent: May 20, 2014

(54) FILE SYSTEM FOR STORAGE AREA NETWORK

(75) Inventors: Lei Chang, Beijing (CN); Ziye Yang, Beijing (CN); Wenbo Mao, Beijing (CN); Ying He, Palo Alto, CA (US); Junping Du, Beijing (CN)

(73) Assignees: EMC Corporation, Hopkinton, MA (US); VMWARE, Inc., Palo Alto, CA (US)

( * ) Notice: Subject to any disclaimer, the term of this patent is extended or adjusted under 35 U.S.C. 154(b) by 421 days.

(21) Appl. No.: 13/073,461

(22) Filed: Mar. 28, 2011

(65) Prior Publication Data
US 2012/0246643 A1  Sep. 27, 2012

(30) Foreign Application Priority Data
Mar. 23, 2011  (CN) .......................... 2011 1 0069907

(51) Int. Cl.
| G06F 9/455 | (2006.01) |
| G06F 9/46 | (2006.01) |
| G06F 15/173 | (2006.01) |
| G06F 15/16 | (2006.01) |
| G06F 9/34 | (2006.01) |

(52) U.S. Cl.
USPC ............... 718/1; 718/104; 709/226; 709/229; 709/238; 711/202; 711/203

(58) Field of Classification Search
None
See application file for complete search history.

(56) References Cited

U.S. PATENT DOCUMENTS

| 7,606,868 B1 * | 10/2009 | Le et al. ........................ 709/211 |
| 7,650,331 B1 | 1/2010 | Dean et al. |
| 8,321,643 B1 * | 11/2012 | Vaghani et al. ................ 711/162 |
| 8,407,448 B1 * | 3/2013 | Hayden et al. ................. 711/203 |
| 2006/0112242 A1 * | 5/2006 | McBride et al. ............... 711/161 |
| 2009/0300302 A1 * | 12/2009 | Vaghani ........................ 711/162 |
| 2010/0257331 A1 * | 10/2010 | Frank ........................... 711/166 |
| 2011/0078682 A1 * | 3/2011 | Doan et al. ......................... 718/1 |
| 2012/0005668 A1 * | 1/2012 | Serizawa et al. .................... 718/1 |
| 2012/0144448 A1 * | 6/2012 | Gunawardena et al. ........... 726/1 |
| 2012/0179874 A1 * | 7/2012 | Chang et al. .................. 711/128 |

OTHER PUBLICATIONS

F. Schmuck et al., "GPFS: A Shared-Disk File System for Large Computing Clusters," Proceedings of the Conference on File and Storage Technologies (FAST), Jan. 2002, pp. 231-244.
S. Ghemawat et al., "The Google File System," ACM Symposium on Operating Systems Principles (SOSP), Oct. 2003, 15 pages.

* cited by examiner

*Primary Examiner* — Abdullah Al Kawsar
(74) *Attorney, Agent, or Firm* — Ryan, Mason & Lewis, LLP

(57) ABSTRACT

Methods and apparatus are disclosed for managing access to data in a data storage system. For example, an apparatus comprises at least one processing platform associated with a distributed virtual infrastructure. The processing platform comprises at least one processing device having a processor coupled to a memory. The processing platform is operative to instantiate a meta data management process that is configured to provide at least one client process with information to allow the client process to perform one or more operations in accordance with one or more data storage devices through a storage area network. The information provided to the client process may comprise one or more data block descriptors. Each of the one or more data block descriptors may comprise path information for at least one of the data storage devices and an offset address in the at least one data storage device. The one or more data block descriptors may correspond to one or more data blocks of a given data file that is stored or storable across the one or more data storage devices.

16 Claims, 5 Drawing Sheets

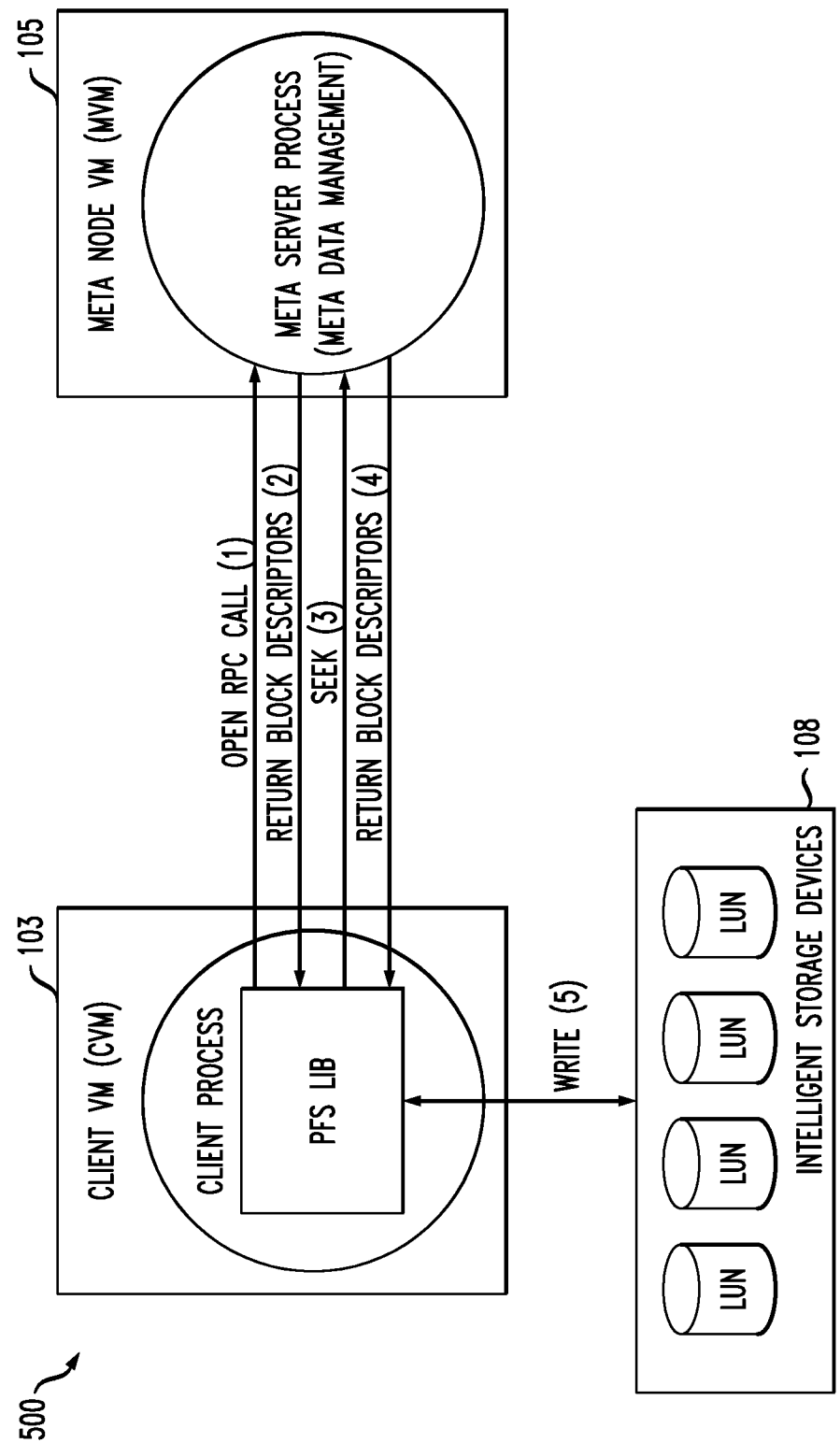

FILE SYSTEM FOR STORAGE AREA NETWORK

FIELD OF THE INVENTION

The present invention relates generally to the field of data storage systems, and more particularly to techniques for managing access to data in such data storage systems.

BACKGROUND OF THE INVENTION

A data intensive scalable computing (DISC) system is a computing system distributed over a cluster or grid of computers that are designed to process large amounts of data that may be generated in a variety of applications and environments. Examples of applications and environments that generate such large amounts of data include, but are not limited to, science (e.g., imagery data), commerce (e.g., online transaction records), and society in general (e.g., medical or other personal records, web pages).

A variety of software frameworks have been introduced that support processing of the large scale data sets in a DISC system. One such software framework is known as MapReduce™ which was developed by Google™ (Mountain View, Calif.) and is described, for example, in U.S. Pat. No. 7,650,331, the disclosure of which is incorporated by reference herein in its entirety. MapReduce™ is a software framework that distributes computations involving large scale data sets over the computers (nodes) of the DISC computer system. In general, MapReduce™ uses "mapper worker" nodes and "reducer worker" nodes to take a given task and break it into sub-tasks which are distributed to one or more nodes of the DISC system for processing. The sub-tasks are processed and results are combined into a composite result for the given task. The "map" stage is generally where the given task is broken into sub-tasks, and the "reduce" stage is generally where the composite result is generated.

Furthermore, access to the large scale data sets in a DISC system is typically managed by a storage file system. In the case of the MapReduce™ environment, a file system such as the Google File System (GFS) may be utilized, see, e.g., S. Ghemawat et al., "The Google File System," $19^{th}$ ACM Symposium on Operating Systems Principles, Lake George, N.Y., October 2003, the disclosure of which is incorporated by reference herein in its entirety. In GFS as applied to a DISC system, servers store "data chunks" as files in the local file system. As such, in a DISC system that employs GFS, the computation and data are tightly coupled. For example, with GFS, the intermediate result of a mapper worker node is written to a local disk, and the intermediate result will then be shuffled to many other reducer worker nodes. Unfortunately, if a mapper worker node fails, the task performed on it has to be redone.

SUMMARY OF THE INVENTION

Principles of the present invention provide techniques for managing access to data in a data storage system.

In one aspect of the invention, an apparatus comprises at least one processing platform associated with a distributed virtual infrastructure. The processing platform comprises at least one processing device having a processor coupled to a memory. The processing platform is operative to instantiate a meta data management process that is configured to provide at least one client process with information to allow the client process to perform one or more operations in accordance with one or more data storage devices through a storage area network.

For example, in an illustrative embodiment, the client process sends a request to the meta data management process to obtain information to allow the client process to perform at least one of the one or more operations. The meta data management process returns information to the client process to allow the client process to perform at least one of the one or more operations. The information provided to the client process may comprise one or more data block descriptors. Each of the one or more data block descriptors may comprise path information for at least one of the data storage devices and an offset address for the at least one data storage device. The one or more data block descriptors may correspond to one or more data blocks of a given data file that is stored or storable across the one or more data storage devices. The one or more data blocks of the given data file may comprise one or more primary data blocks and one tail data block.

Further, in an illustrative embodiment, the meta data management process is implemented by a meta data management virtual machine and the client process is implemented by a client virtual machine The meta data management virtual machine and the client virtual machine are part of the distributed virtual infrastructure. An operation of the one or more operations performed by the client virtual machine comprises a data read operation or a data write operation, which are examples of input/output (I/O) operations.

In a second aspect of the invention, a storage area network file system comprises a meta data management virtual machine and a mapping element. The meta data management virtual machine is instantiated by at least one processing platform configured to provide a plurality of client virtual machines with data block descriptors to allow the plurality of client virtual machines to perform one or more of data read operations and data write operations on a given data file that is stored or storable as corresponding data blocks on one or more data storage devices accessible through a storage area network. The mapping element is coupled to the one or more data storage devices and to the plurality of client virtual machines through the storage area network. The mapping element resolves the data block descriptors to allow the plurality of client virtual machines to access the corresponding data blocks of the given data file on the one or more data storage devices.

Advantageously, techniques of the invention provide a decoupling of the computation and data in a computer system such as a DISC system. This is accomplished at least by the meta data management process (virtual machine) providing the client processes (virtual machines) with meta data (in the form of data block descriptors) that allows the client processes to directly access (concurrently or in parallel) the data storage devices through the storage area network. Such a decoupling of computation and data, as provided by principles of the invention, improves resource utilization and leads to a more energy efficient DISC solution, as will be further explained herein. Different workloads can also be deployed on the same large cluster while accommodating dynamic changes in each workload. Furthermore, techniques of the present invention advantageously provide improved system performance. As will be evident, with a file system according to an illustrative embodiment of the invention, the I/O path for map and reduce functions are shortened thus improving system performance.

These and other features and advantages of the present invention will become more readily apparent from the accompanying drawings and the following detailed description.

BRIEF DESCRIPTION OF THE DRAWINGS

FIG. 5 shows a data file write process in the file system and storage area network of FIG. 1 in accordance with one embodiment of the invention.

DETAILED DESCRIPTION

Figure 1:
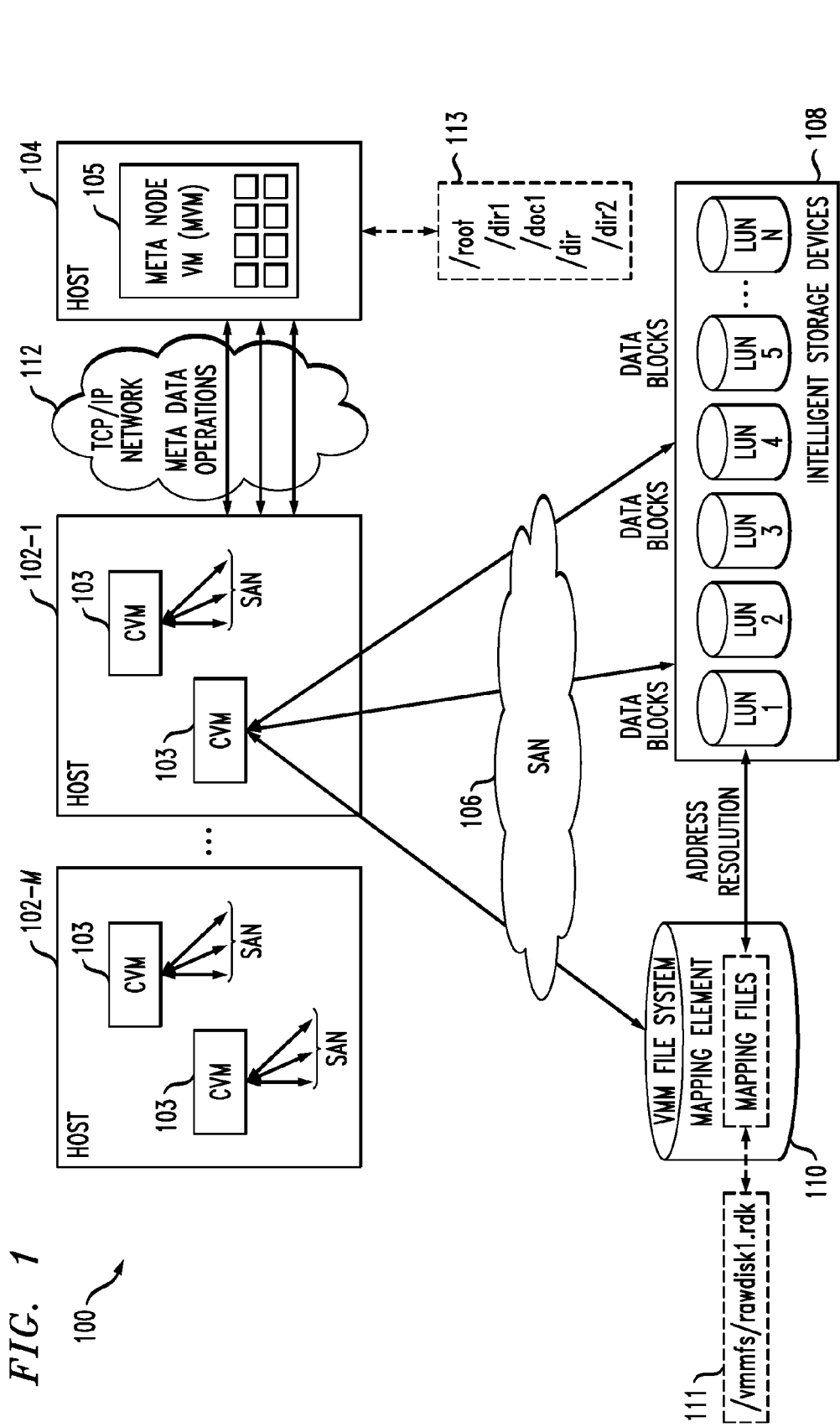
FIG. 1 shows a file system and storage area network in accordance with one embodiment of the invention.

The present invention will be described herein with reference to exemplary computing systems and data storage systems and associated servers, computers, storage devices and other processing devices. It is to be appreciated, however, that the invention is not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Furthermore, the phrase "file system" as used herein generally refers to a system that provides access management functions (e.g., assistance with data read and data write operations, as well as any other I/O operations) for data stored on a data storage system. It is understood that when a data block or data file can be accessed at the same time by more than one accessing entity, a file system is desired to ensure data integrity.

In an illustrative embodiment of the invention, as will be described in detail below, a parallel storage area network (SAN) file system is provided on a virtual platform for use in a data intensive scalable computing (DISC) system. That is, the computing system with which the file system operates in this embodiment is a DISC system and the data storage system is a SAN. The implementation comprises one or more processing platforms with a distributed virtual infrastructure. As such, in this illustrative embodiment, the file system is able to accommodate the file access patterns of the DISC system and provides optimized performance for the virtual platform with SAN and intelligent storage devices. However, it is to be understood that principles of the invention are not limited to any particular DISC system or any particular SAN.

A virtual platform (distributed virtual infrastructure) implements the computing concept known as "virtualization." Virtualization generally allows one or more "virtual machines" (VMs) to run on a single physical machine, with each virtual machine sharing the resources of that one physical machine. Thus, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization may be implemented by inserting a layer of software directly on the computer hardware in order to provide a virtual machine monitor or "hypervisor" that allocates hardware resources of the physical computer dynamically and transparently. The hypervisor affords the ability for multiple operating systems to run concurrently on a single physical computer and share hardware resources with each other.

Commercially available virtualization software such as VMware® vSphere™ may be used to build complex virtual infrastructure, including private and public cloud computing and storage systems, distributed across hundreds of interconnected physical computers and storage devices. Thus, a "distributed virtual infrastructure" generally refers to computing and storage elements that are realized via the instantiation (generation or creation) of one or more virtual machines. Such arrangements advantageously avoid the need to assign servers, storage devices or network bandwidth permanently to each application. Instead, the available hardware resources are dynamically allocated when and where they are needed. High priority applications can therefore be allocated the necessary resources without the expense of dedicated hardware used only at peak times.

FIG. 1 shows a parallel SAN and file system 100 according to an illustrative embodiment of the invention. As shown, system 100 comprises a plurality of hosts 102-1, ..., 102-M, wherein each host implements one or more client virtual machines (CVMs) 103 which represent one or more client processes. The system 100 further comprises a host 104 which implements a meta node virtual machine (MVM) 105 which represents a meta data management process. Each CVM 103 is coupled through a storage area network (SAN) 106 to a data storage system 108. Thus, since each CVM is coupled to data storage system 108 through SAN 106 and multiple CVMs can access the same data file in parallel or concurrently, this arrangement is referred to as a parallel SAN. It is also to be understood that when it is explained that a host or other computing element implements a virtual machine, it is generally meant that the virtual machine is generated or created (i.e., instantiated) to perform whatever functionality (one or more processes) is required of or specified for that particular virtual machine.

As is known, SAN 106 comprises a plurality of SAN switches or other network elements which permit the hosts 102-1, ..., 102-M to directly connect with the data storage network 108. The hosts, or more particularly, CVMs 103, may access the data storage system 108, for example, to perform data read or write requests or other I/O (input/output) operations. In one embodiment, the communication medium of SAN 106 utilizes the Fibre Channel (FC) communication protocol.

However, the communication medium that connects the hosts with the data storage system is not limited to an FC SAN arrangement but rather may be any one or more of a variety of networks or other types of communication connections, such as a network connection, bus or other type of data link, as known to those skilled in the art. For example, the communication medium may be the Internet, an intranet or any other wired or wireless connection(s) by which the hosts 102 may access and communicate with the data storage system 108, and may also communicate with other components included in the system 100. As such, communications over the medium 106 may alternatively be in accordance with known protocols, such as Small Computer System Interface (SCSI), Internet SCSI (iSCSI), etc.

The hosts 102 and data storage system 108 may all be located at the same physical site, or may be located at different physical sites. Each of the hosts 102 may perform different types of data operations in accordance with different types of tasks. For example, any one of the hosts 102 may issue a data request to the data storage system 108 to perform a data operation. More particularly, an application executing on one of the hosts 102 may perform a read or write operation resulting in one or more data requests to the data storage system 108.

It is to be appreciated that data storage system 108 may comprise a single data storage system, such as a single data storage array, or may also represent, for example, multiple data storage arrays alone, or in combination with other data storage devices, systems, appliances, or other components having suitable connectivity, such as in a SAN, in an embodiment using the techniques herein. It should also be noted that an embodiment may include data storage arrays or other components from one or more vendors. For example, the data storage system 108 may be implemented as an otherwise conventional Symmetrix® DMX™ data storage array or a CLARiiON® data storage array commercially available from EMC Corporation of Hopkinton, Mass. However, as will be appreciated by those skilled in the art, the techniques disclosed herein are applicable for use with other data storage arrays by other vendors and with other components than those expressly described herein for purposes of example.

The data storage system 108 comprises a plurality of data storage devices, which may be associated with one or more storage arrays. These physical data storage devices (not individually shown in FIG. 1 but cumulatively illustrated therein as "intelligent storage devices") may include one or more different types of data storage devices such as, for example, one or more disk drives, one or more solid state drives (SSDs), etc. Thus, the storage devices may comprise flash memory devices employing one or more different flash memory technologies. In such an implementation, the data storage devices may include a combination of disk devices and flash devices in which the flash devices may appear as standard FC disk drives to the various software tools used in connection with the data storage array. The disk devices may be any one or more different types of disk devices such as, for example, an advanced technology attachment (ATA) disk drive, FC disk drive, and the like. The flash devices may be constructed using different types of memory technologies such as nonvolatile semiconductor NAND flash memory forming one or more SLC (single level cell) devices or MLC (multi-level cell) devices. Flash memory devices and disk devices are two exemplary types of storage devices that may be included in a data storage system used in connection with the techniques described herein.

While the hosts 102 directly access the data storage system 108 via the SAN 106, the hosts access stored data from what the hosts view as a plurality of logical units (LUs). The LUs may or may not correspond to the actual physical storage devices. For example, one or more LUs may reside on a single physical drive or multiple drives, or on a variety of subsets of multiple drives. For example, as shown in FIG. 1, data storage system 108 comprises LUs 1, 2, . . . , N (LUN referring to logical unit number). Data in a single data storage system, such as a single data storage array, may be accessed by multiple hosts allowing the hosts to share the data residing therein.

Recall that host 104 implements MVM 105. MVM 105 stores and manages meta data of system 100. As is known, "meta data" is generally data about data. Examples of the type of meta data that MVM 105 handles include, but are not limited to, file system directory information (e.g., as illustrated in 113), information about the raw (physical) storage devices of the data storage system 108, and information about data blocks stored in data storage system 108 such information being in the form of data block descriptors which will be explained in further detail below. Thus, MVM 105 is a meta data management virtual machine.

The MVM 105 provides a file access interface to each of the CVMs 103 on the hosts 102, which allows for the decoupling of the handling of computations and data in the processing platform upon which the elements in FIG. 1 are embodied. As shown, the connection between the CVMs 103 and the MVM 105 via which meta data operations are performed is through a TCP/IP (Transmission Control Protocol/Internet Protocol) network 112; however, other connection/communication protocols are possible.

As further shown in FIG. 1, system 100 comprises a virtual machine monitor (VMM) file system mapping element 110. The VMM file system mapping element 110 maintains mapping files (maps) that associate logical unit addresses with physical device addresses. That is, VMM file system mapping element 110 maintains the mapping files which are symbolic links that point to physical storage (raw) devices exposed by one or more backend storage systems (i.e., backend storage systems that are part of data storage system 108). Thus, when a CVM 103 uses the one or more data block descriptors obtained from the MVM 105 to send a data read or write request to the data storage system 108, the VMM file system mapping element 110 uses the mapping files to resolve the correct logical unit address that corresponds to the one or more storage locations that the CVM seeks to access. Note that each block of data that may be stored (storable) or is stored in the data storage system 108 has a block descriptor which includes the global path of the raw (physical) device the data block resides in (or will reside in once written) and the offset (beginning address) in that raw device. By way of example, reference numeral 111 in FIG. 1 shows one example of a mapping file that may be stored in mapping element 110, e.g., /vmmfs/rawdisk1.rdk. After receiving the block descriptor, i.e., global path of the raw (physical) device that the subject data block resides in (or will reside once written) and the offset (beginning address) in that raw device, the mapping element 110 accesses the corresponding mapping file (e.g., /vmmfs/rawdisk1.rdk) and obtains therefrom an indication as to which one or more logical units numbers (LUNs) correspond to those data blocks. Thus, the data in that data block location can be read by the requesting CVM (if read operation) or data can be written to that data block location by the requesting CVM (if write operation).

It is to be appreciated that one or more of the elements (e.g., hosts 102, host 104, SAN 106, data storage system 108, VMM file system mapping element 110, TCP/IP network 112) shown in FIG. 1 may be implemented as part of private or public cloud computing or storage systems. Further, at least a subset of the elements may be collectively implemented on a common processing platform, or each such element may be implemented on a separate processing platform comprising one or more servers, computers or other processing devices.

Figure 2:
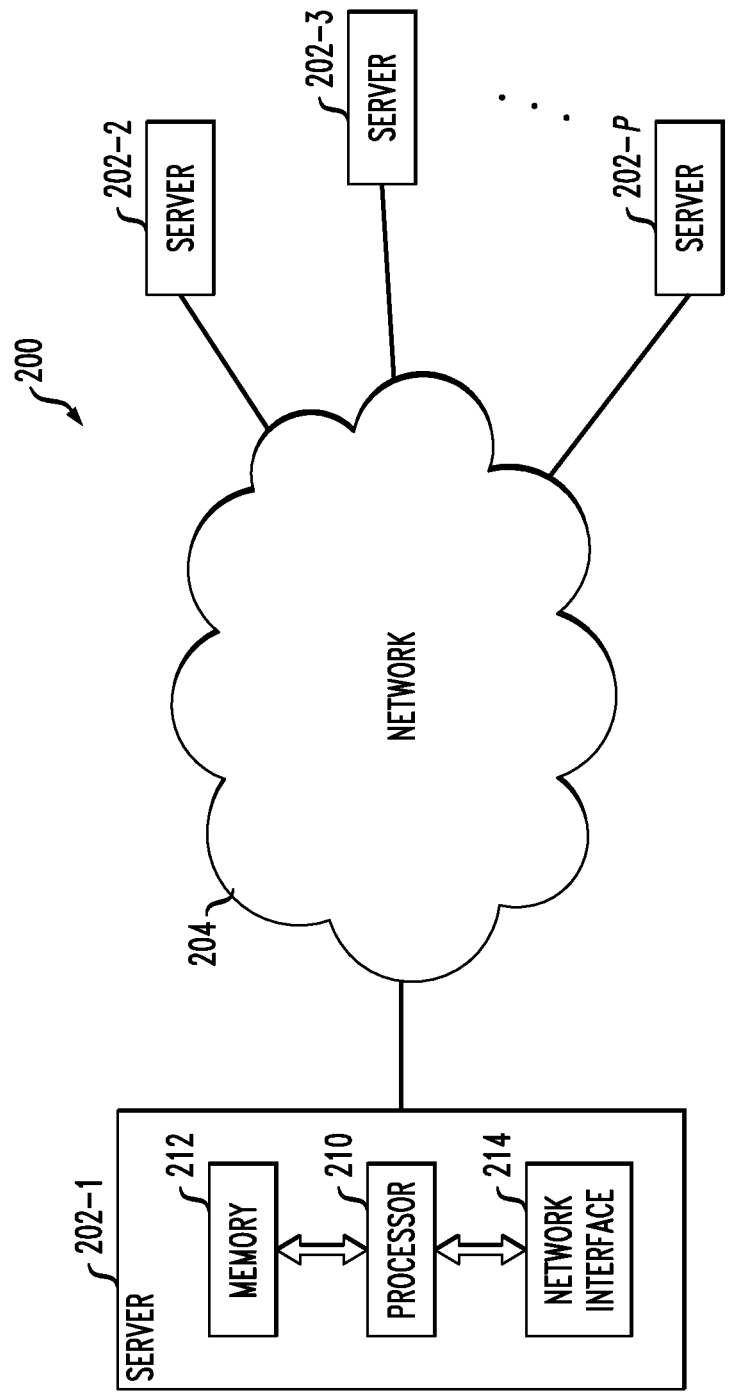
FIG. 2 shows a processing platform on which the file system and storage area network of FIG. 1 is implemented in accordance with one embodiment of the invention.

An example of such a processing platform is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying aspects of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

The operation of elements of system 100 will now be described in greater detail with reference to FIGS. 3 through 5.

In the parallel SAN file system 100, a file is stored in a plurality of data blocks in data storage system 108. Each data block has a data block descriptor which includes the global path of the raw device (physical storage device) the block resides in and the offset (beginning address) in that raw device. There are two types of blocks: primary blocks and tail blocks. Primary blocks are large data blocks of size S which is typically larger than or equal to about 64MB (Megabytes), and used to provide fast sequential access. Tail blocks are small data blocks of variable size (smaller than S) which are used to avoid allocating a large block for only a small chunk of data in the tail of the file. A common occurrence for a DISC file is that it contains many primary blocks and exactly one tail block. However, a file may be composed of one primary block and one tail block.

Figure 3:
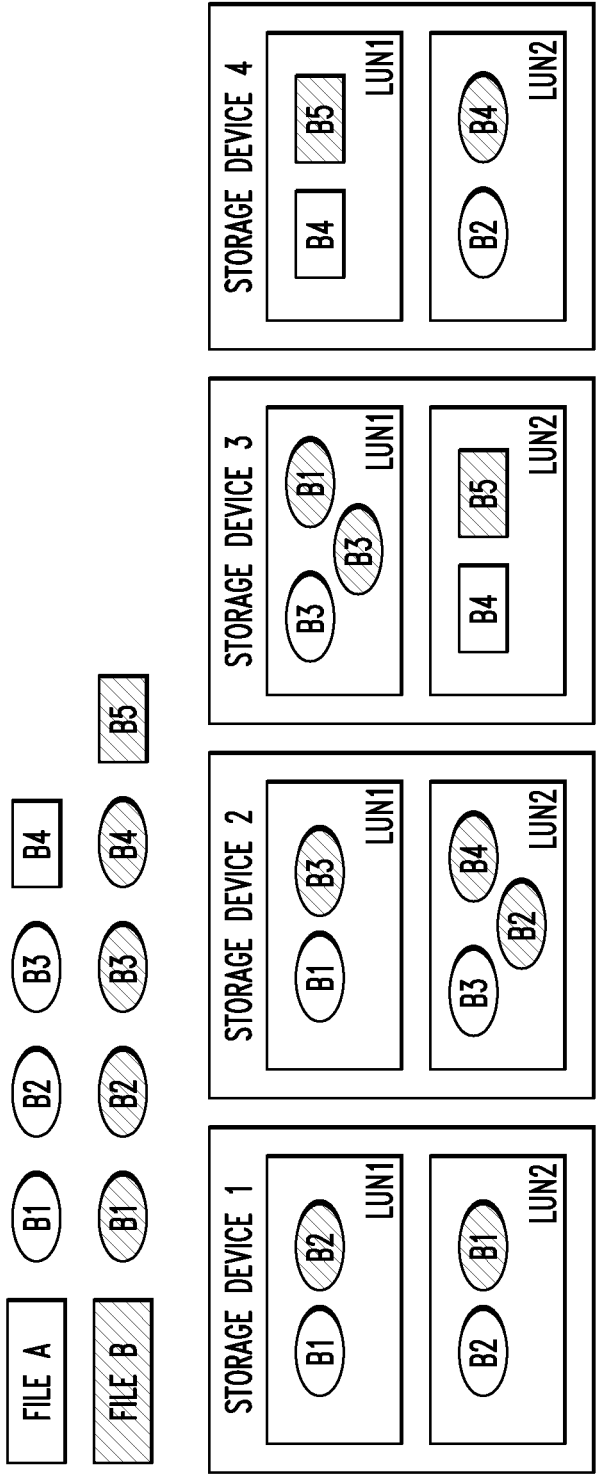
FIG. 3 shows an example of storage of data files in accordance with one embodiment of the invention.

FIG. 3 shows an example of storage of DISC files in accordance with one embodiment of the invention. As shown, file A is composed of three primary data blocks (B1, B2 and B3) and one tail data block (B4), and file B is composed of four primary data blocks (B1, B2, B3 and B4) and one tail data block (B5). For ease of explanation, it is assumed that the data storage system that file A and file B are stored in comprises four physical storage devices (raw devices) 1, 2, 3 and 4, each with two logical units (LUNs 1 and 2) implemented thereon. Of course, this is for illustration purposes only and it is understood that the data storage system (e.g., 108 in FIG. 1) may have a smaller or larger number of raw devices, each of which have a smaller or larger number of LUs implemented thereon. Also, there is no requirement that data blocks of a particular file be stored on consecutive raw devices or consecutive LUs, as illustratively depicted in FIG. 3.

It is also assumed that the data storage system implements a replication factor of two. For example, the application with which file A and file B are associated requires that two copies of each file be maintained and that copies of the same data block of a file are not stored on the same raw device. These requirements are satisfied by the distribution of primary and tail data blocks of file A and file B as shown in FIG. 3.

Each data block stored on the storage devices in FIG. 3 is identified by a unique data block descriptor. The data block descriptors of the data blocks stored in the data storage system are part of the meta data that the MVM 105 of FIG. 1 stores and maintains. It is to be appreciated that the locking granularity of the system 100 is therefore at file or block level. For a block, in one illustrative embodiment of the invention, the system 100 can have multiple concurrent readers (CVMs performing read operation) with no concurrent writers (CVMs performing write operation), or exactly one writer without concurrent readers. With this locking model, a file can be concurrently read and different blocks can be concurrently written by different writers with the exception that only one appending writer is allowed.

Figure 4:
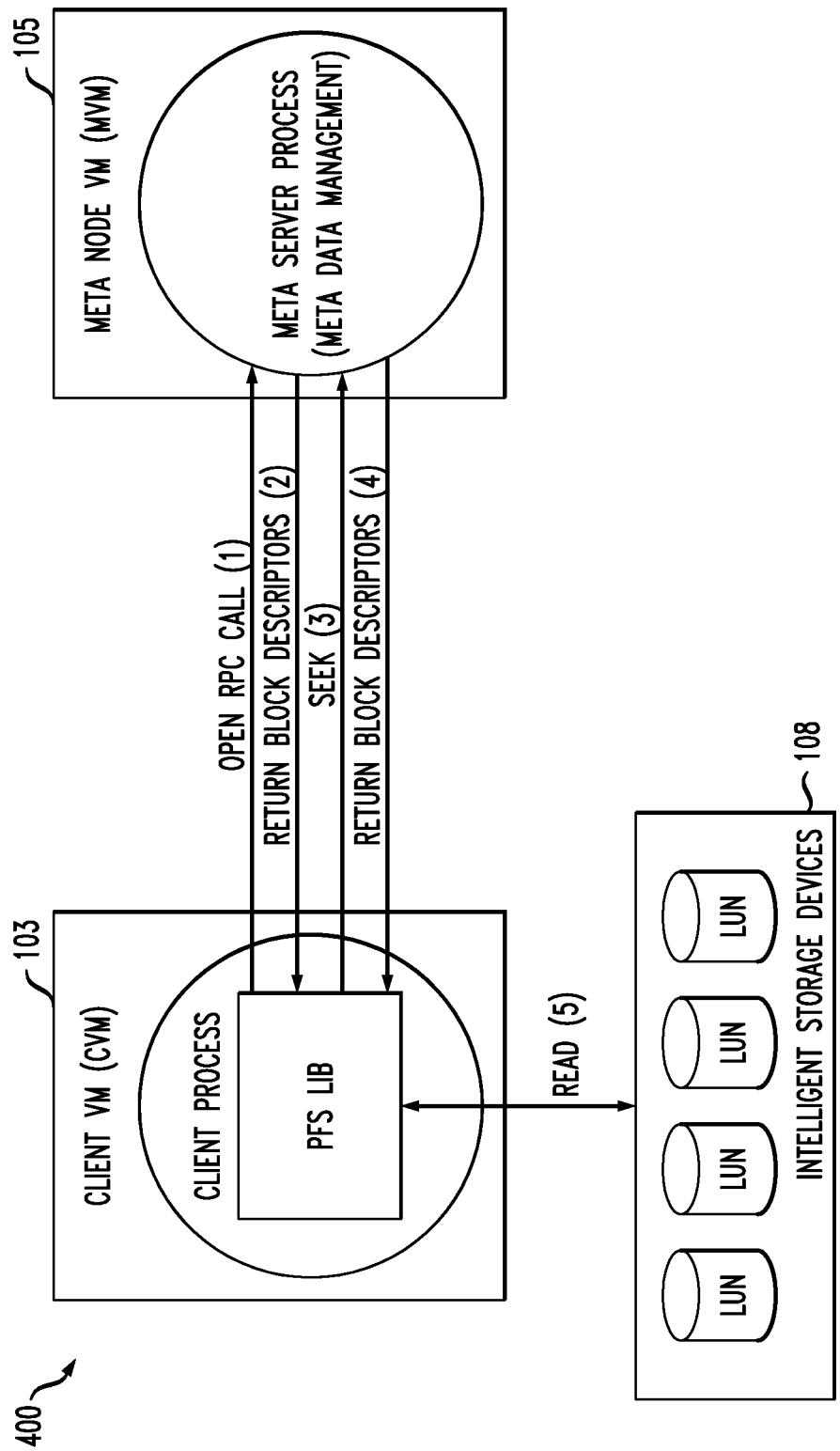
FIG. 4 shows a data file read process in the file system and storage area network of FIG. 1 in accordance with one embodiment of the invention.

FIG. 4 shows a file read process 400 in the file system and storage area network of FIG. 1 in accordance with one embodiment of the invention. The file read process 400 is a process whereby a CVM 103, with the assistance of MVM 105, reads one or more data blocks that correspond to a file that is stored in data storage system 108. In order to simplify the description of the file read process 400, locking steps and error checking are assumed to be omitted. One of ordinary skill in the art will realize how such locking steps and error checking may be implemented given the detailed descriptions herein.

In step 1, the CVM 103 requests the MVM 105 to send one or more data block descriptors stored by the MVM 105. As explained above, the one or more data block descriptors correspond to one or more addresses associated with the one or more data storage devices. As specifically shown in FIG. 4, step 1 is accomplished by the CVM 103 invoking an open remote procedure call (RPC) to the MVM 105. The RPC includes the following parameters: a file name (of the subject file to be read) and a read flag. In step 2, the MVM 105 returns a list of block descriptors of the subject file to the CVM 103. If the number of the blocks of the file is large, only the first N block descriptors (N is a selectable system parameter) are returned. The list of block descriptors is cached (stored locally) in the client side (at the CVM 103).

In step 3, the CVM 103 invokes a seek with the following parameters: file descriptor (fd) and an offset. In this step, the CVM 103 first checks the cached blocks. If the block descriptors of the requested blocks are in local cache, the process goes to step 5. Otherwise, the CVM 103 requests the (additional) corresponding block descriptors from the MVM 105. In step 4, the MVM 105 returns the requested block descriptors, and adjacent block descriptors may be prefetched to accommodate the sequential access patterns of a DISC file. In step 5, using the retrieved block descriptors, the CVM 103 reads the data blocks of the subject file from the appropriate storage locations of the physical (raw) devices in the data storage system 108 directly through SAN 106 (not shown in FIG. 3). The CVM 103 may also prefetch other data blocks. Note that the file read functions can be implemented in a parallel file system library (PFS Lib). These functions may be used to read the file directly from the data storage system 108 via the SAN 106.

FIG. 5 shows a file write process 500 in the file system and storage area network of FIG. 1 in accordance with one embodiment of the invention. The file write process 500 is a process whereby a CVM 103, with the assistance of MVM 105, writes one or more data blocks that correspond to a file that is to be stored (or updated) in data storage system 108. In order to simplify the description of the file write process 500, locking steps and error checking are assumed to be omitted. One of ordinary skill in the art will realize how such locking steps and error checking may be implemented given the detailed descriptions herein.

In step 1, the CVM 103 requests the MVM 105 to send one or more data block descriptors stored by the MVM 105. As explained above, the one or more data block descriptors correspond to one or more addresses associated with the one or more data storage devices. As specifically shown in FIG. 5, step 1 is accomplished by the CVM 103 invoking an open remote procedure call (RPC) to the MVM 105. The RPC includes the following parameters: a file name (of the subject file to be written or updated) and a write flag. In step 2, the MVM 105 returns a list of block descriptors of the subject file to the CVM 103. If the number of the blocks of the file is large, only the first N block descriptors (N is a selectable system parameter) are returned. The list of block descriptors is cached (stored locally) in the client side (at the CVM 103).

In step 3, the CVM 103 invokes a seek with the following parameters: file descriptor (fd) and an offset. In this step, the CVM 103 first checks the cached blocks. If the block descriptors of the requested blocks are in local cache, the process goes to step 5. Otherwise, the CVM 103 requests the (additional) corresponding block descriptors from the MVM 105. In step 4, the MVM 105 returns the requested block descriptors. If at the end of the file (offset is past the end of the file), a new block is allocated by the MVM 105. The new block is written in the client side (CVM) cache. In step 5, using the retrieved block descriptors, the CVM 103 writes the data blocks of the subject file to the appropriate storage locations of the physical (raw) devices in the data storage system 108 directly through SAN 106 (not shown in FIG. 3). Note that if a new block is added, when the cached block is full or the write is finished, the block is submitted to the MVM 105. The MVM 105 allocates a primary/tail block for the cached block. Note also that the file write functions can be implemented in a parallel file system library (PFS Lib). These functions may be used to write the file directly to the data storage system 108 via the SAN 106.

It should be noted that the particular processing operations and other system functionality described in conjunction with the diagrams of FIGS. 3 through 5 are presented by way of illustrative example only, and should not be construed as limiting the scope of the invention in any way. Alternative embodiments can use other types of processing operations for performing data file reads and writes.

Also, as indicated previously, functionality such as that described in conjunction with the diagrams of FIGS. 3 through 5 can be implemented at least in part in the form of one or more software programs stored in memory and executed by a processor of a processing device such as a computer or server. A memory having such program code embodied therein is an example of what is more generally referred to herein as a "computer program product."

The illustrative embodiments provide numerous advantages over existing techniques.

As mentioned above, in GFS based systems, the computation and data are tightly coupled. For example, in the MapReduce™ computing model, the intermediate result of a mapper worker is written to local disk. The intermediate result will be shuffled to many other reducer workers. If a mapper failed, the work on it should be redone. For the architecture and methodologies provided in accordance with embodiments of the invention, data and computation are decoupled, and thus computation nodes are nearly stateless. The inventive techniques allow the free restart of a failed node and migration of any node. Free migration leads to many advantages. Virtual machines can be easily and freely moved, and resources can be effectively utilized. Idle physical machines can be powered off to save energy, and other types of tasks besides DISC tasks can also be assigned to the idle resources. While in existing methods, even when the workload is not heavy and there are many idle resources, the entire cluster of computers is typically powered on, thus leading to a significant waste of energy.

In addition, existing DISC file systems do not consider the environment of virtualization. They suffer from poor I/O performance. Take the MapReduce™ computing model as an example. In the map phase, the block access path is Client→GFS→Linux File System→SAN File System→SAN Storage Devices. And for the reduce phase, the block access path is Client→TCP/IP Network→Linux File System→SAN File System→SAN Storage Devices. Thus, the long path and some slow part of the path degrade I/O performance in such existing systems.

In accordance with illustrative embodiments of the invention, the decoupling of computation and data improves resource utilization and leads to a more energy efficient DISC solution. Different workload can even be deployed on the same large cluster to accommodate the dynamic changes of workload.

Another advantage of the invention is improved performance. For the file system in an illustrative embodiment of the invention, the I/O paths for map and reduce are both simply Client→File System in this invention→SAN Storage Devices. The path is short, and the slow part in the path is eliminated. Thus, the I/O performance is enhanced. In DISC systems, the most time consuming part is associated with I/O operations. The improvement of I/O performance, in accordance with inventive principles described herein, leads to the overall performance improvement of the DISC system.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform associated with a distributed virtual infrastructure, the processing platform comprising at least one processing device having a processor coupled to a memory, wherein the processing platform is operative to instantiate a meta data management process, executing on a virtual machine hosted by the at least one processing device, that is configured to provide at least one of a plurality of client processes, executing on a plurality of virtual machines hosted by the at least one processing device, with information to allow the client process to perform one or more data storage operations in accordance with one or more data storage devices through a storage area network based on a request to obtain the information to perform the one or more data storage operations;
wherein the information provided by the meta data management process to the at least one client process comprises meta data which the client process, during the one or more data storage operations, provides to a mapping element in a file system of the storage area network such that the mapping element performs an address resolution operation to determine from the provided meta data which one or more logical storage units, executing on the one or more data storage devices, correspond to the provided meta data, and accesses the determined one or more logical storage units to perform the one or more data storage operations;
wherein the metadata provided to the client processes comprises one or more data block descriptors comprising path information for the one or more data storage devices and an offset address for the one or more data storage devices; and
wherein the mapping element is coupled to the one or more storage devices, and coupled to the plurality of client processes through the storage area network.

2. The apparatus of claim 1, wherein the one or more data block descriptors correspond to one or more data blocks of a given data file that is stored or storable across the one or more data storage devices, and wherein the one or more data blocks of the given data file comprise one or more primary data blocks and one tail data block.

3. The apparatus of claim 1, wherein the virtual machine executing the meta data management process is a meta data management virtual machine and the virtual machine executing the client process is a client virtual machine.

4. The apparatus of claim 3, wherein an operation of the one or more data storage operations performed by the client virtual machine comprises a data read operation or a data write operation.

5. The apparatus of claim 4, wherein the operation comprises the client virtual machine requesting the meta data management virtual machine to send one or more data block descriptors stored by the meta data management virtual machine, the data block descriptors corresponding to one or more addresses associated with the one or more data storage devices.

6. The apparatus of claim 5, wherein the operation further comprises the meta data management virtual machine returning at least a portion of the one or more requested data block descriptors to the client virtual machine.

7. The apparatus of claim 6, wherein the operation further comprises the client virtual machine locally storing the one or more data block descriptors returned by the meta data management virtual machine.

8. The apparatus of claim 7, wherein the operation further comprises the client virtual machine requesting one or more additional block descriptors from the meta data management virtual machine when the one or more additional block descriptors are not locally stored by the client virtual machine.

9. The apparatus of claim 8, wherein the operation further comprises the meta data management virtual machine returning the requested one or more additional data block descriptors to the client virtual machine.

10. The apparatus of claim 6, wherein when the operation comprises a data read operation, the client virtual machine uses at least a portion of the one or more data block descriptors obtained from the meta data management virtual machine to read one or more corresponding data blocks from the one or more data storage devices through the storage area network.

11. The apparatus of claim 6, wherein when the operation comprises a data write operation, the client virtual machine uses at least a portion of the one or more data block descriptors obtained from the meta data management virtual machine to write one or more corresponding data blocks to the one or more data storage devices through the storage area network.

12. The apparatus of claim 1, wherein the processing platform comprises a cloud infrastructure.

13. The apparatus of claim 1, wherein the processing platform comprises a data intensive scalable computing platform, the plurality of client processes are operatively coupled to the storage area network in a parallel manner and separately operatively coupled to the meta data management process, and one or more data computational operations performed by the at least one client process are decoupled from the one or more data storage operations.

14. A method comprising:
instantiating a meta data management process on at least one processing platform associated with a distributed virtual infrastructure, wherein the meta data management process, executing on a virtual machine hosted by at least one processing device of the processing platform, is configured to provide at least one of a plurality of client processes, executing on a plurality of virtual machines hosted by the at least one processing device, with information to allow the client process to perform one or more data storage operations in accordance with one or more data storage devices through a storage area network based on a request to obtain the information to perform the one or more data storage operations;
wherein the information provided by the meta data management process to the at least one client process comprises meta data which the client process, during the one or more data storage operations, provides to a mapping element in a file system of the storage area network such that the mapping element performs an address resolution operation to determine from the provided meta data which one or more logical storage units, executing on the one or more data storage devices, correspond to the provided meta data, and accesses the determined one or more logical storage units to perform the one or more data storage operations;
wherein the metadata provided to the client processes comprises one or more data block descriptors comprising path information for the one or more data storage devices and an offset address for the one or more data storage devices; and wherein the mapping element is coupled to the one or more storage devices, and coupled to the plurality of client processes through the storage area network.

15. A computer program product comprising a non-transitory processor-readable storage medium having encoded therein executable code of one or more software programs, wherein the one or more software programs when executed by the processing platform implement the step of the method of claim 14.

16. A storage area network file system comprising:

a meta data management virtual machine, instantiated by at least one processing platform configured to provide a plurality of client virtual machines with data block descriptors to allow the plurality of client virtual machines to perform one or more of data read operations and data write operations on a given data file that is stored or storable as corresponding data blocks on one or more data storage devices accessible through a storage area network based on a request to obtain the data block descriptors to perform the one or more of the data read operations and the data write operations;

a mapping element coupled to the one or more data storage devices and to the plurality of client virtual machines through the storage area network, wherein the data block descriptors provided by the meta data management virtual machine to the plurality of client virtual machines are provided to the mapping element during the one or more of the data read operations and the data write operations, wherein the mapping element resolves the data block descriptors provided thereto by the plurality of client virtual machines to determine from the provided data block descriptors which one or more logical storage units executing on the one or more data storage devices correspond to the provided data block descriptors to allow the plurality of client virtual machines to access the corresponding data blocks of the given data file on the one or more logical storage units of the one or more data storage devices that correspond to the data block descriptors, and wherein the data block descriptors comprise path information and an offset address for the one or more data storage devices; and one or more processing devices for implementing the meta data management virtual machine and the mapping element.

* * * * *